(12) United States Patent
Kurita et al.

(10) Patent No.: US 9,667,114 B2
(45) Date of Patent: May 30, 2017

(54) STATOR, MANUFACTURING METHOD THEREFOR, AND ROTARY ELECTRIC MACHINE THAT INCLUDES STATOR

(71) Applicant: Mitsubishi Electric Corporation, Chiyoda-ku, Tokyo (JP)

(72) Inventors: Kazuhisa Kurita, Chiyoda-ku (JP); Chiaki Sugano, Chiyoda-ku (JP); Naruhiko Kawasaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 514 days.

(21) Appl. No.: 14/247,414

(22) Filed: Apr. 8, 2014

(65) Prior Publication Data

US 2015/0137634 A1 May 21, 2015

(30) Foreign Application Priority Data

Nov. 18, 2013 (JP) ................. 2013-237675

(51) Int. Cl.
*H02K 1/00* (2006.01)
*H02K 3/52* (2006.01)
(Continued)

(52) U.S. Cl.
CPC ............. *H02K 3/522* (2013.01); *H02K 1/148* (2013.01); *H02K 3/28* (2013.01); *H02K 3/50* (2013.01);
(Continued)

(58) Field of Classification Search
CPC .... H02K 3/325; H02K 3/522; H02K 2203/06; H02K 2203/09; H02K 2203/12
See application file for complete search history.

(56) References Cited

U.S. PATENT DOCUMENTS 6,127,753 A * 10/2000 Yamazaki ............. H02K 3/522
310/194
7,471,025 B2 * 12/2008 Sheeran ................. H02K 1/148
310/216.009
(Continued)

FOREIGN PATENT DOCUMENTS

JP 3613262 B2 1/2005
JP 2008-312277 A 12/2008
JP 2010-110160 A 5/2010

OTHER PUBLICATIONS

Communication dated Oct. 28, 2014, issued by the Japanese Patent Office in counterpart Japanese application No. 2013-237675.

*Primary Examiner* — Dang Le
(74) *Attorney, Agent, or Firm* — Sughrue Mion, PLLC; Richard C. Turner

(57) ABSTRACT

A stator is configured so as to have an annular shape by linking core blocks that are each produced by laminating electromagnetic steel sheets and that each have a yoke portion and a tooth portion by bendable first linking portion, concentrated winding coils are each produced by winding a conductor wire around the tooth portion for a number of turns so as to pass through concave spaces that are formed by the trunk portions and first and second guiding portions of first and second insulating bobbins, and current-carrying member holding portions that hold first current-carrying members that configure the concentrated winding coils into alternating-current connections are constituted by holding grooves that are each formed so as to open radially outward and so as to pass through the first guiding portions circumferentially, and that are arranged in three layers in an axial direction.

9 Claims, 12 Drawing Sheets

(51) Int. Cl.
*H02K 3/28* (2006.01)
*H02K 15/00* (2006.01)
*H02K 3/50* (2006.01)
*H02K 1/14* (2006.01)
*H02K 3/32* (2006.01)

(52) U.S. Cl.
CPC ......... *H02K 15/0062* (2013.01); *H02K 3/325* (2013.01); *H02K 2203/06* (2013.01); *H02K 2203/09* (2013.01); *H02K 2203/12* (2013.01); *Y10T 29/49012* (2015.01)

(56) References Cited

U.S. PATENT DOCUMENTS

| | | | | |
|---|---|---|---|---|
| 7,557,478 | B2* | 7/2009 | Hoshika | H02K 3/522 310/180 |
| 8,497,618 | B2* | 7/2013 | Kato | H02K 3/522 310/194 |
| 2012/0267979 | A1* | 10/2012 | Yoshida | H02K 3/522 310/214 |
| 2012/0286619 | A1* | 11/2012 | Tsuiki | H02K 3/522 310/215 |

* cited by examiner

STATOR, MANUFACTURING METHOD THEREFOR, AND ROTARY ELECTRIC MACHINE THAT INCLUDES STATOR

BACKGROUND OF THE INVENTION

1. Field of the Invention

The present invention relates to a stator, a manufacturing method therefor, and a rotary electric machine that includes that stator that are applied to a rotary electric machine such as an electric motor or an alternator that is mounted to a vehicle, for example.

2. Description of the Related Art

Conventional rotary electric machines include: a current-carrying member that includes a strip-shaped current-carrying portion, and that is formed by bending arm portions in a plate thickness direction of the strip-shaped current-carrying portion, the arm portions being integrated with the strip-shaped current-carrying portion and extending outward from side and end portions of this strip-shaped current-carrying portion so as to be approximately parallel to a longitudinal direction; an annular holder that holds this current-carrying member; and a plurality of coils that are wound, wherein the coils are connected to the arm portions (see Patent Literature 1, for example).

CITATION LIST

Patent Literature

[Patent Literature 1] Japanese Patent No. 3513262 (Gazette)

In conventional rotary electric machines, because a holder that holds the current-carrying member that connects the coils is required, one problem has been that the number of parts is increased.

Because the holder is disposed approximately coaxially at a first axial end of a stator, another problem has been that axial dimensions of the apparatus are increased.

SUMMARY OF THE INVENTION

The present invention aims to solve the above problems and an object of the present invention is to provide a stator, a manufacturing method therefor, and a rotary electric machine that includes a stator, that can reduce the number of parts, suppress increases in axial dimensions, and enable downsizing.

In order to achieve the above object, according to one aspect of the present invention, there is provided a stator including: a stator core including a rectilinear core member that is produced by laminating electromagnetic steel sheets in which core blocks that each have a yoke portion and a tooth portion that protrudes radially inward from an inner circumferential wall surface of the yoke portion are constituted by linking outer circumferential edge portions of circumferential side surfaces of the yoke portions by bendable first linking portions, the stator core being configured into an annular shape by bending the first linking portions; a plurality of pairs of insulating bobbins that each have: a trunk portion; and first and second guiding portions that protrude at two longitudinal ends of an upper surface of the trunk portion, the plurality of pairs of insulating bobbins being each disposed on two axial end surfaces of the core blocks such that longitudinal directions of the trunk portions are oriented in a radial direction of the tooth portions and bottom surfaces of the trunk portions are placed alongside axial end surfaces of the tooth portions; a plurality of coils that are each produced by winding a conductor wire around the tooth portions for a predetermined number of turns so as to pass through concave spaces that are formed by the trunk portions and the first and second guiding portions of the insulating bobbins that are disposed on the two axial end surfaces of the core blocks; and a plurality of current-carrying members to which coil terminals of the plurality of coils are connected to configure the plurality of coils into an alternating-current connection, wherein current-carrying member holding portions that hold the plurality of current-carrying members are formed on the first guiding portions that are positioned on a radially outer side of the insulating bobbins.

According to the present invention, because current-carrying member holding portions that hold current-carrying members are formed on first guiding portions that are positioned on a radially outer side of insulating bobbins, it is not necessary to additionally dispose a member that holds the current-carrying members, reducing the number of parts. Furthermore, because it is not necessary to dispose a member that holds the current-carrying members axially outside the stator core, increases in axial dimensions of the stator are suppressed, enabling downsizing.

DETAILED DESCRIPTION OF THE PREFERRED EMBODIMENTS

Embodiment 1

Figure 1:
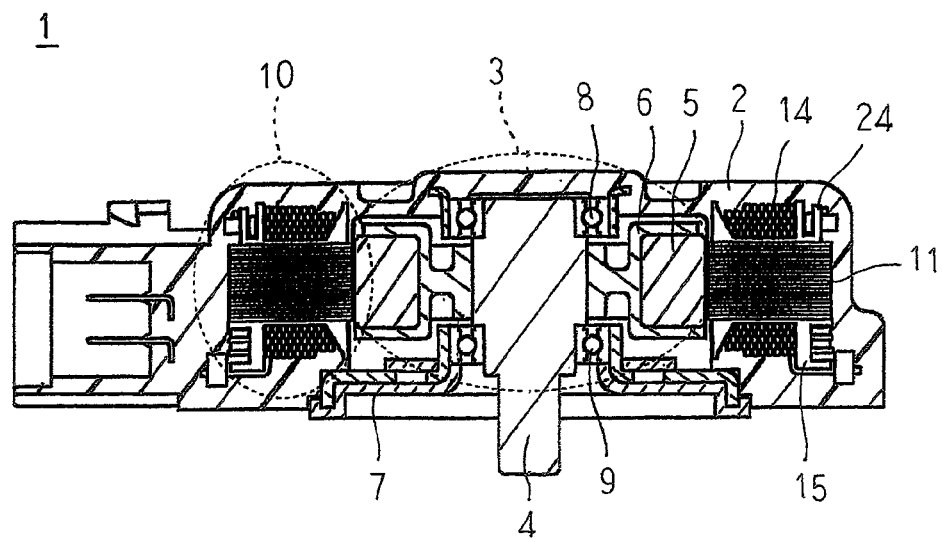
FIG. 1 is a longitudinal cross section that shows a brushless motor according to Embodiment 1 of the present invention.
Figure 2:
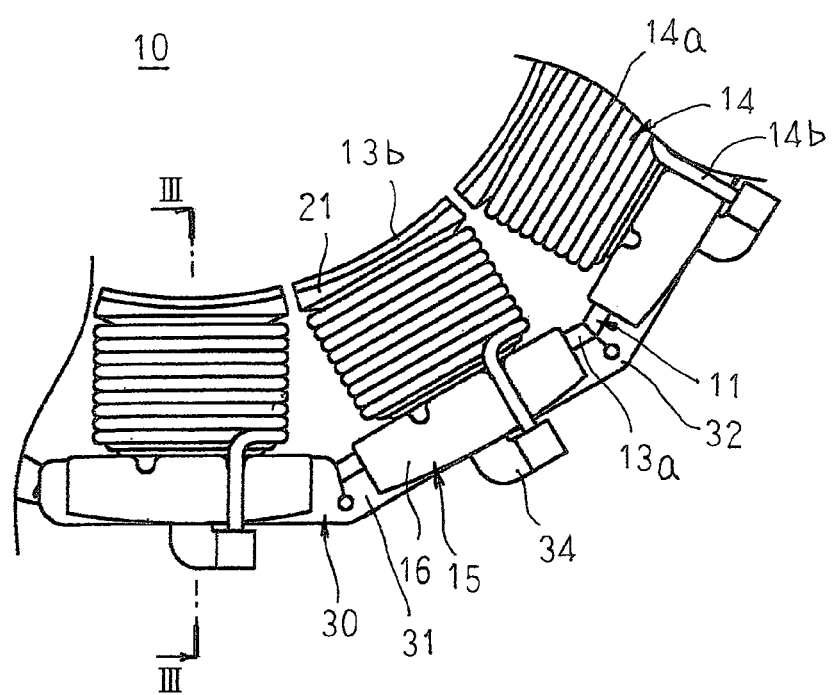
FIG. 2 is a partial plan that shows a stator of the brushless motor according to Embodiment 1 of the present invention.
Figure 3:
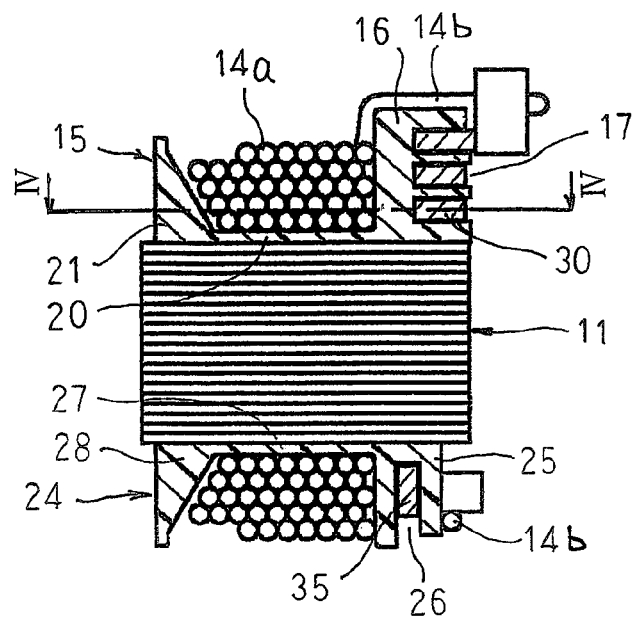
FIG. 3 is a cross section that is taken along Line III-III in FIG. 2 so as to be viewed in the direction of the arrows.
Figure 4:
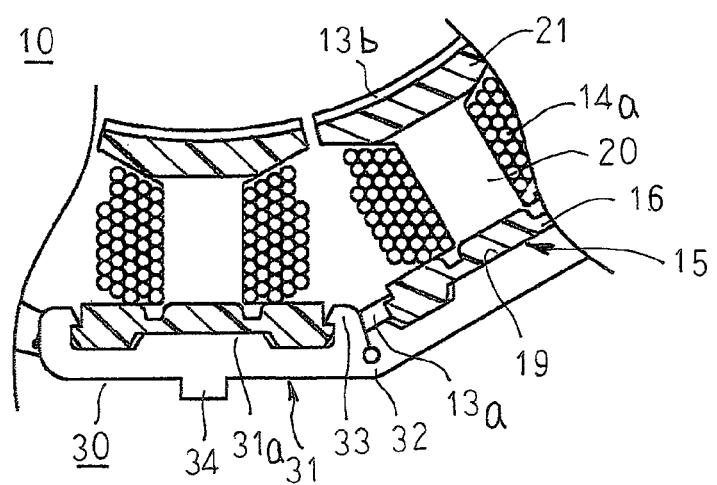
FIG. 4 is a cross section that is taken along Line IV-IV in FIG. 3 so as to be viewed in the direction of the arrows.
Figure 5:
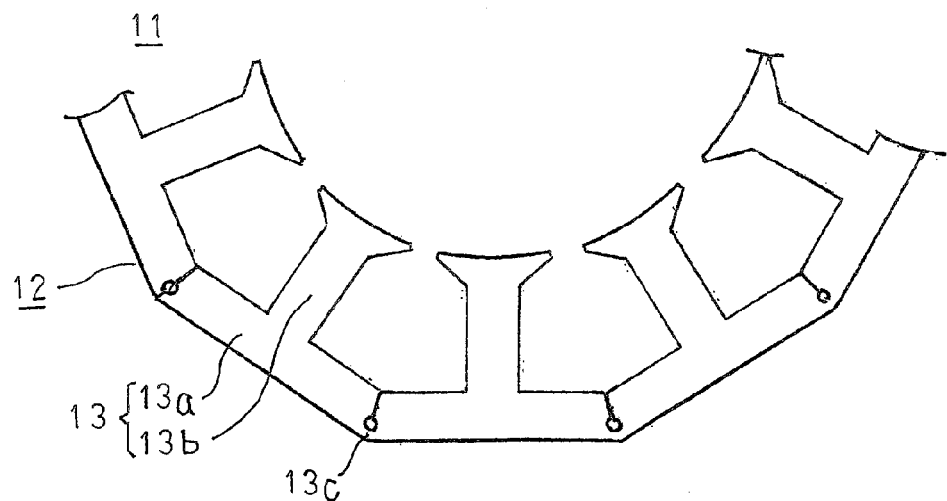
FIG. 5 is an end elevation that shows a stator core of the brushless motor according to Embodiment 1 of the present invention.
Figure 6:
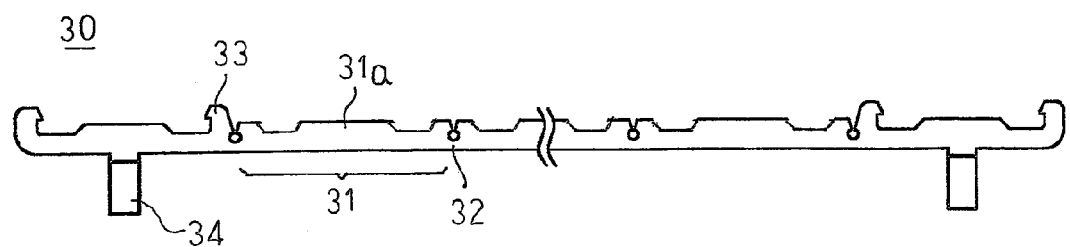
FIG. 6 is a front elevation that shows a first current-carrying member that is used in the stator of the brushless motor according to Embodiment 1 of the present invention.
Figure 7:
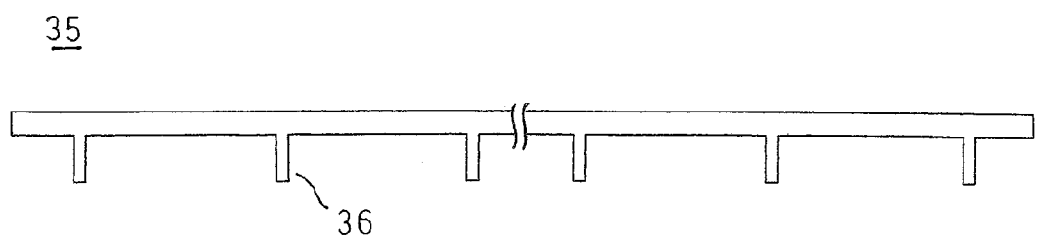
FIG. 7 is a front elevation that shows a second current-carrying member that is used in the stator of the brushless motor according to Embodiment 1 of the present invention.
Figure 8:
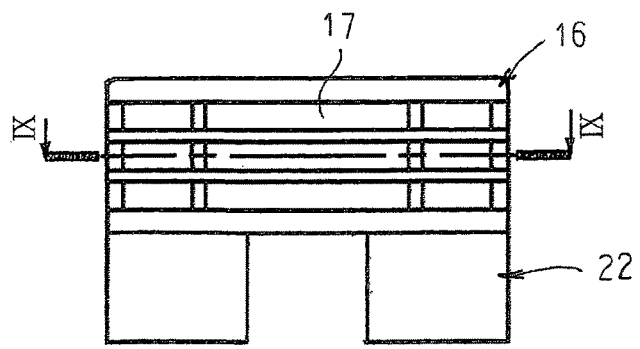
FIG. 8 is a front elevation that shows a first insulating bobbin that is used in the stator of the brushless motor according to Embodiment 1 of the present invention.
Figure 9:
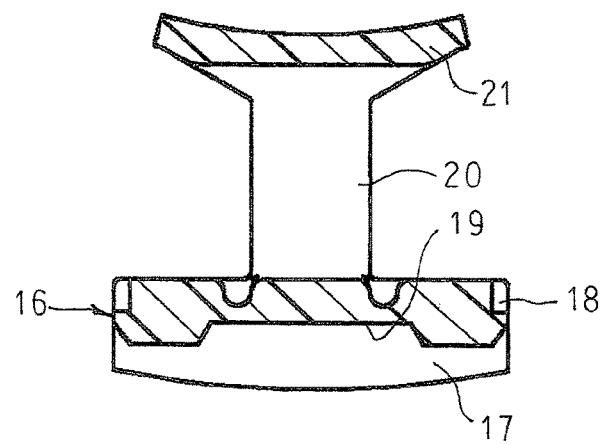
FIG. 9 is a cross section that is taken along Line IX-IX in FIG. 8 so as to be viewed in the direction of the arrows.
Figure 10:
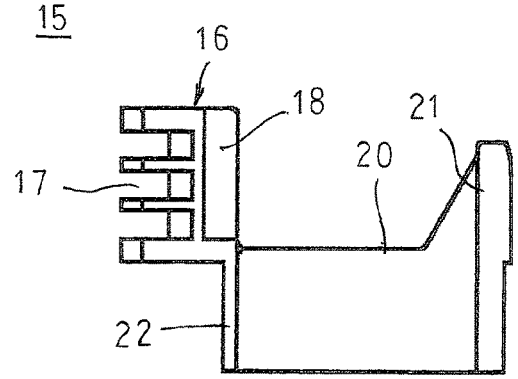
FIG. 10 is a side elevation that shows the first insulating bobbin that is used in the stator of the brushless motor according to Embodiment 1 of the present invention.
Figure 11:
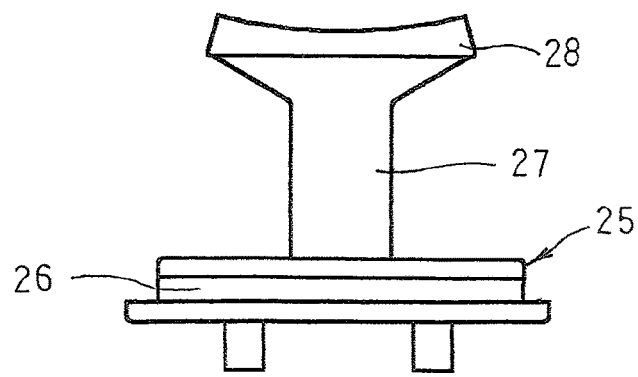
FIG. 11 is a front elevation that shows a second insulating bobbin that is used in the stator of the brushless motor according to Embodiment 1 of the present invention.
Figure 12:
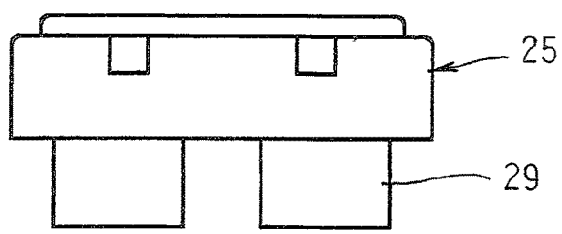
FIG. 12 is an end elevation that shows the second insulating bobbin that is used in the stator of the brushless motor according to Embodiment 1 of the present invention.
Figure 13:
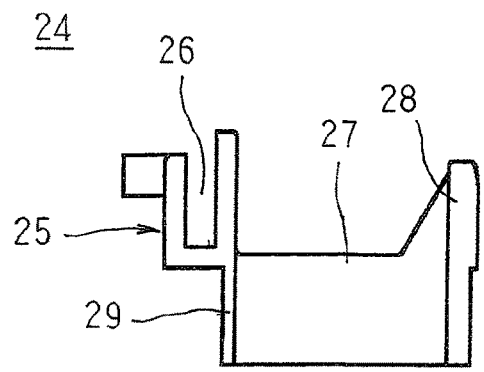
FIG. 13 is a side elevation that shows the second insulating bobbin that is used in the stator of the brushless motor according to Embodiment 1 of the present invention.
Figure 14A:
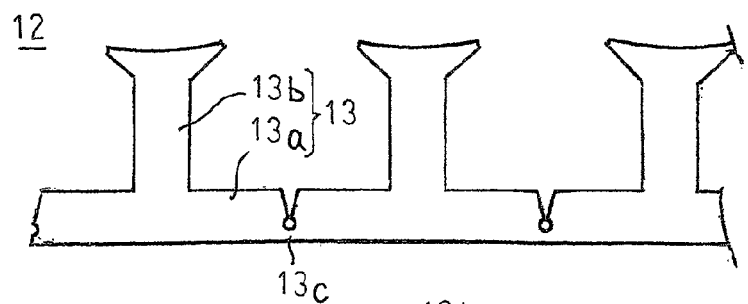
FIGS. 14A through 14E are diagrams that explain a method for assembling the stator of the brushless motor according to Embodiment 1 of the present invention.
Figure 14B:
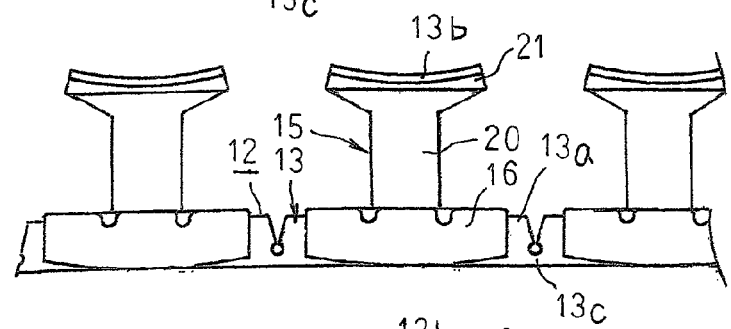
Figure 14C:
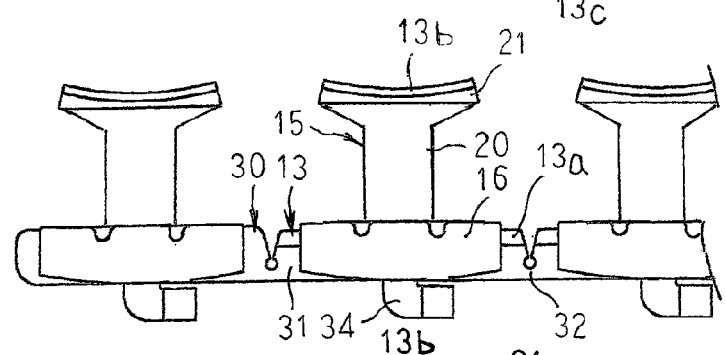
Figure 14D:
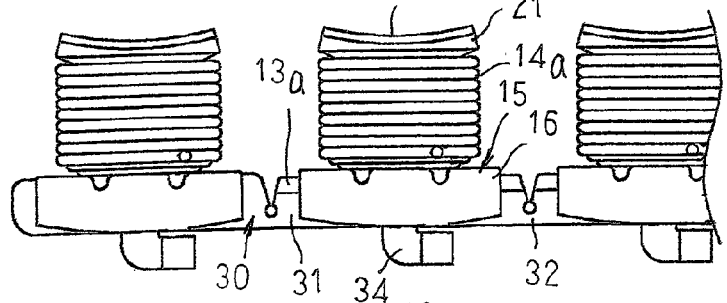
Figure 14E:
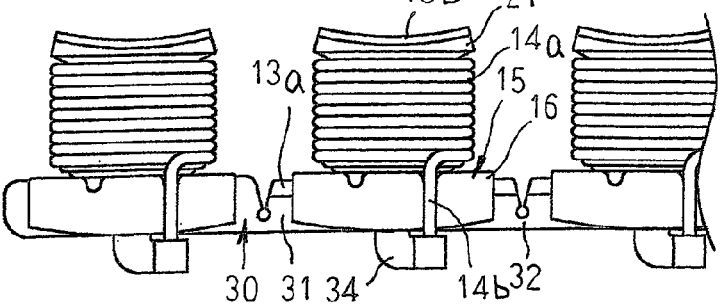
Figure 15:
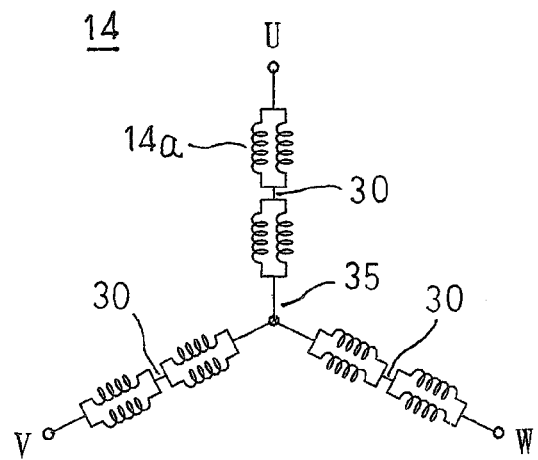
FIG. 15 is a connection diagram for a stator winding in the brushless motor according to Embodiment 1 of the present invention.

FIG. 1 is a longitudinal cross section that shows a brushless motor according to Embodiment 1 of the present invention, FIG. 2 is a partial plan that shows a stator of the brushless motor according to Embodiment 1 of the present invention, FIG. 3 is a cross section that is taken along Line III-III in FIG. 2 so as to be viewed in the direction of the arrows, FIG. 4 is a cross section that is taken along Line IV-IV in FIG. 3 so as to be viewed in the direction of the arrows, FIG. 5 is an end elevation that shows a stator core of the brushless motor according to Embodiment 1 of the present invention, FIG. 6 is a front elevation that shows a first current-carrying member that is used in the stator of the brushless motor according to Embodiment 1 of the present invention, FIG. 7 is a front elevation that shows a second current-carrying member that is used in the stator of the brushless motor according to Embodiment 1 of the present invention, FIG. 8 is a front elevation that shows a first insulating bobbin that is used in the stator of the brushless motor according to Embodiment 1 of the present invention, FIG. 9 is a cross section that is taken along Line IX-IX in FIG. 8 so as to be viewed in the direction of the arrows, FIG. 10 is a side elevation that shows the first insulating bobbin that is used in the stator of the brushless motor according to Embodiment 1 of the present invention, FIG. 11 is a front elevation that shows a second insulating bobbin that is used in the stator of the brushless motor according to Embodiment 1 of the present invention, FIG. 12 is an end elevation that shows the second insulating bobbin that is used in the stator of the brushless motor according to Embodiment 1 of the present invention, FIG. 13 is a side elevation that shows the second insulating bobbin that is used in the stator of the brushless motor according to Embodiment 1 of the present invention, FIGS. 14A through 14E are diagrams that explain a method for assembling the stator of the brushless motor according to Embodiment 1 of the present invention, and FIG. 15 is a connection diagram for a stator winding in the brushless motor according to Embodiment 1 of the present invention.

In FIG. 1, a brushless motor 1 that functions as a rotary electric machine includes: a housing 2; a rotor 3 that is rotatably disposed inside the housing 2; and an approximately annular stator 10 that is held by the housing 2 so as to be disposed coaxially around a circumference of the rotor 3 so as to have an air gap interposed.

The rotor 3 includes: a shaft 4; and an annular permanent magnet 5 that is fixed by a resin portion 6 so as to be coaxial with the shaft 4, and is produced integrally by molding such that the shaft 4 is disposed at a central axial position of the permanent magnet 5. The permanent magnet 5 is magnetized such that North-seeking (N) poles and South-seeking (S) poles are arranged so as to alternate circumferentially. The rotor 3 is rotatably disposed inside the housing 2 such that the shaft 4 is supported by a bearing 8 that is held by the housing 2 and a bearing 9 that is held by a front cover 7.

The stator 10 includes: an approximately annular stator core 11; and a stator winding 14 that is mounted into the stator core 11. The housing 2 is constituted by a resin-molded body that is formed by molding so as to cover the stator 10. Moreover, tip end surfaces of tooth portions 13b of the stator core 11 are exposed through the housing 2.

To assemble a brushless motor 1 that is configured in this manner, the rotor 3 is first mounted into the housing 2 by press-fitting a first end of the shaft 4 into the bearing 8 that is held by the housing 2. Next, the front cover 7 is mounted onto the housing 2 by press-fitting the bearing 9 that is held by the front cover 7 onto a second end of the shaft 4 to assemble the brushless motor 1. The brushless motor 1 is then attached to various kinds of actuators through the front cover 7.

Next, configuration of the stator 10 will be explained with reference to FIGS. 2 through 15.

As shown in FIG. 5, the stator core 11 is constituted by a core member 12 which is a strip-shaped body in which core blocks 13 that are constituted by circular arc-shaped yoke portions 13a and tooth portions 13b that protrude radially inward from inner circumferential wall surfaces of the yoke portions 13a are linked continuously by means of thin linking portions 13c that function as first linking portions. The core member 12 is produced by stacking and integrating a number of press-formed electromagnetic steel sheets. The stator core 11 is produced by bending the core member 12 into an approximately annular shape by bending the linking portions 13c, which link together outer circumferential edge portions of the yoke portions 13a. Here, to facilitate explanation, the stator core 11 is assumed to be configured into an approximately annular shape by abutting together circumferential side surfaces of the yoke portions 13a of twelve core blocks 13.

A first insulating bobbin 15 is a resin-molded body that is molded using nylon, for example, and as shown in FIGS. 8 through 10, includes: a trunk portion 20 that is disposed so as to orient a longitudinal direction in a radial direction of a tooth portion 13b such that a bottom surface lies alongside a first axial end surface of the tooth portion 13b; a first guiding portion 16 that protrudes from a first longitudinal end of the trunk portion 20 away from the bottom surface (away from a yoke portion 13a); a second guiding portion 21 that protrudes from a second longitudinal end of the trunk portion 20 away from the bottom surface (away from the tooth portion 13b) so as to face the first guiding portion 16; and a skirt portion 22 that protrudes from the trunk portion 20, the first guiding portion 16, and the second guiding portion 21 to cover a first axial end portion of the inner circumferential wall surface of the yoke portion 13a and first axial end portions of side surfaces of the tooth portion 13b.

Three holding grooves 17 are formed on the first guiding portion 16 so as to line up axially, so as to open radially outward and so as to have groove directions in a circumferential direction, to constitute current-carrying member holding portions. Bearing portions 18 are formed so as to be positioned radially inside the three holding grooves 17 on two circumferential side surfaces of the first guiding portion 16. Engaging recess portions 19 are formed on circumferentially central portions of bottom portions of the holding grooves 17.

A second insulating bobbin 24 is a resin-molded body that is molded using nylon, for example, and as shown in FIGS. 11 through 13, includes: a trunk portion 27 that is disposed so as to orient a longitudinal direction in a radial direction of a tooth portion 13b such that a bottom surface lies alongside a second axial end surface of the tooth portion 13b; a first guiding portion 25 that protrudes from a first longitudinal end of the trunk portion 27 away from the bottom surface (away from a yoke portion 13a); a second guiding portion 28 that protrudes from a second longitudinal end of the trunk portion 27 away from the bottom surface (away from the tooth portion 13b) so as to face the first guiding portion 25; and a skirt portion 29 that protrudes from the trunk portion 27, the first guiding portion 25, and the second guiding portion 28 to cover a second axial end portion of the inner circumferential wall surface of the yoke portion 13a and second axial end portions of side surfaces of the tooth portion 13b. A single holding groove 26 is formed on the first guiding portion 25 so as to open axially outward and so as to have a groove direction in a circumferential direction to constitute a current-carrying member holding portion.

A first current-carrying member 30 is produced by press-molding a thin sheet of copper, for example, and as shown in FIG. 6, is configured into a rectilinear strip-shaped body by continuously linking first lateral ends of longitudinal end portions of seven flat, approximately rectangular current-carrying portions 31 to each other by means of narrow linking portions 32 that function as second linking portions. Here, the narrow linking portions 32 are produced by forming notches on a second latitudinal side between the current-carrying portions 31 during press-forming. Engaging salient portions 31a that fit together with the engaging recess portions 19 are formed on longitudinally central portions of long sides that are positioned on the second latitudinal side of each of the current-carrying portions 31. Engaging hooks 33 that snap-fit onto the bearing portions 18 are formed so as to protrude onto the second latitudinal side from two longitudinal end portions of the first current-carrying portion 31 and the seventh current-carrying portion 31. In addition, coil connecting terminals 34 are formed so as to protrude from longitudinally central portions of long sides that are positioned on first latitudinal sides of the first, fourth, and seventh current-carrying portions 31.

As shown in FIG. 7, a second current-carrying member 35 is produced into a rectilinear strip-shaped body by press-molding a thin sheet of copper, for example. The second current-carrying member 35 has a length that is approximately equal to a circumferential length of the stator core 11. Six coil connecting terminals 36 are respectively formed at a uniform pitch longitudinally so as to protrude outward in a width direction from a first long side of the second current-carrying member 35.

To assemble the stator 10, a number of press-formed electromagnetic steel sheets are first stacked and integrated to produce a rectilinear core member 12 in which the yoke portions 13a of the core blocks 13 are arranged continuously so as to be linked by the linking portions 13c, as shown in FIG. 14A. Next, as shown in FIG. 14B, the first insulating bobbins 15 are disposed on the first axial ends of each of the core blocks 13 such that the first guiding portions 16 are disposed on first axial (direction of lamination of the electromagnetic steel sheets) end surfaces of the yoke portions 13a, and the first axial end surfaces of the tooth portions 13b are covered by the trunk portions 20, the second guiding portions 21, and the skirt portions 22. Although not shown, the second insulating bobbins 24 are disposed on the second axial ends of each of the core blocks 13 such that the first guiding portions 25 are disposed on second axial end surfaces of the yoke portions 13a, and the second axial end surfaces of the tooth portions 13b are covered by the trunk portions 27, the second guiding portions 28, and the skirt portions 29.

Next, one first current-carrying member 30 is inserted from a direction of projection of the tooth portions 13b (a radial direction) into a group of holding grooves 17 that are positioned on a first side in the direction of lamination of the electromagnetic steel sheets (the axial direction) among the three holding grooves 17 that are formed on the first guiding portions 16 of the first insulating bobbins 15 that are disposed on the first axial ends of the first through seventh core blocks 13 such that a plate thickness direction of the first current-carrying member 30 is oriented in the axial direction. As shown in FIG. 3, the engaging salient portions 31a are thereby fitted into the engaging recess portions 19 to position the first current-carrying member 30. The engaging hooks 33 are also snap-fitted onto the bearing portions 18 such that the first current-carrying member 30 is housed and held in the first insulating bobbins 15.

Next, one first current-carrying member 30 is inserted into a group of holding grooves 17 that are positioned centrally in the axial direction among the three holding grooves 17 that are formed on the first guiding portions 16 of the first insulating bobbins 15 that are disposed on the first axial ends of the second through eighth core blocks 13. The engaging salient portions 31a are thereby fitted into the engaging recess portions 19 to position the first current-carrying member 30. The engaging hooks 33 are also snap-fitted onto the bearing portions 18 such that the first current-carrying member 30 is housed and held in the first insulating bobbins 15. In addition, one first current-carrying member 30 is inserted into a group of holding grooves 17 that are positioned on a second side in the axial direction among the three holding grooves 17 that are formed on the first guiding portions 16 of the first insulating bobbins 15 that are disposed on the first axial ends of the third through ninth core blocks 13. The engaging salient portions 31a are thereby fitted into the engaging recess portions 19 to position the first current-carrying member 30. The engaging hooks 33 are also snap-fitted onto the bearing portions 18 such that the first current-carrying member 30 is housed and held in the first insulating bobbins 15.

In this manner, three first current-carrying members 30 are housed and held in the holding grooves 17 of twelve first insulating bobbins 15 that are disposed on a first axial end of the core member 12, as shown in FIG. 14D. The coil connecting terminals 34 project from the holding grooves 17 of each of the first insulating bobbins 15.

Next, one second current-carrying member 35 is inserted from an axial direction into a group of holding grooves 26 that are formed on the first guiding portions 25 of the second insulating bobbins 24 that are disposed on the second axial ends of the seventh through twelfth core blocks 13 such that a plate thickness direction of the second current-carrying member 35 is oriented in the radial direction. The second current-carrying member 35 is thereby housed and held in holding grooves 26 of twelve second insulating bobbins 24 that are disposed on a second axial end of the core member 12. The coil connecting terminals 36 project from the holding grooves 26 of each of the second insulating bobbins 24.

Next, as shown in FIG. 14C, an conductor wire that is constituted by an enamel-coated copper wire, for example, is passed through concave spaces that are formed by the trunk portions 20 and 27 and the first and second guiding portions 16, 21, 25, and 28 of the first and second insulating bobbins 15 and 24 that are disposed on the two axial end surfaces of the first core block 13, and wound around the tooth portion 13b for a predetermined number of turns, and then is passed through the concave spaces that are formed by the trunk portions 20 and 27 and the first and second guiding portions 16, 21, 25, and 28 of the first and second insulating bobbins 15 and 24 that are disposed on the two axial end surfaces of the fourth core block 13, and wound around the tooth portion 13b for a predetermined number of turns, to mount concentrated winding coils 14a onto the first and fourth core blocks 13. Similarly, concentrated winding coils 14a are mounted onto the second and fifth core blocks 13, and concentrated winding coils 14a are mounted onto the third and sixth core blocks 13. Coil terminals 14b of the concentrated winding coils 14a, which are winding start end portions and winding finish end portions, are led out to the first axial end.

Next, concentrated winding coils 14a are mounted onto the seventh and tenth core blocks 13. Concentrated winding coils 14a are additionally mounted onto the eighth and eleventh core blocks 13, and concentrated winding coils 14a are mounted onto the ninth and twelfth core blocks 13. Coil terminals 14b of the concentrated winding coils 14a are led out to the second axial end.

Next, as shown in FIG. 14E, a crossover wire between the coil terminals 14b of the concentrated winding coils 14a that are mounted onto the first and fourth core blocks 13 and the concentrated winding coils 14a that are mounted onto the seventh and tenth core blocks 13 is connected by fusing to the coil connecting terminal 34 of the first current-carrying member 30 that is inserted into the group of holding grooves 17 that are positioned on a first side in the axial direction among the three holding grooves 17. A crossover wire between the coil terminals 14b of the concentrated winding coils 14a that are mounted onto the second and fifth core blocks 13 and the concentrated winding coils 14a that are mounted onto the eighth and eleventh core blocks 13 is connected by fusing to the coil connecting terminal 34 of the first current-carrying member 30 that is inserted into the group of holding grooves 17 that are positioned centrally in the axial direction among the three holding grooves 17. In addition, a crossover wire between the coil terminals 14b of the concentrated winding coils 14a that are mounted onto the third and sixth core blocks 13 and the concentrated winding coils 14a that are mounted onto the ninth and twelfth core blocks 13 is connected by fusing to the coil connecting terminal 34 of the first current-carrying member 30 that is inserted into the group of holding grooves 17 that are positioned on a second side in the axial direction among the three holding grooves 17.

Next, the coil terminals 14b and 14c of the concentrated winding coils 14a that are mounted onto the seventh through twelfth core blocks 13 are connected to the coil connecting terminals 36 of the second current-carrying member 35 by fusing.

A stator winding 14 is thereby obtained that is formed by wye-connecting a U-phase coil, a V-phase coil, and a W-phase that are each configured by connecting four concentrated winding coils 14a into two series and two parallel connections, as shown in FIG. 15. Moreover, the crossover wire between the concentrated winding coils 14a that are mounted onto the first and fourth core blocks 13, the crossover wire between the concentrated winding coils 14a that are mounted onto the second and fifth core blocks 13, and the crossover wire between the concentrated winding coils 14a that are mounted onto the third and sixth core blocks 13 constitute power supplying portions of the U-phase coil, the V-phase coil, and the W-phase, respectively.

Next, the core member 12 is bent into an approximately annular shape by bending the linking portions 13c that link together the outer circumferential edge portions of the yoke portions 13a. At this point, the first current-carrying members 30 are bent into an approximately annular shape by bending the linking portions 32. The second current-carrying member 35 is also bent into an approximately annular shape by being bent in the plate thickness direction. Then, circumferential side surfaces of the yoke portions 13a of the core blocks 13 that are positioned on the two ends of the core member 12 are abutted together and the core member 12 is made to have an approximately annular shape, to produce a stator 10, as shown in FIG. 2. Next, a housing 2 that integrates the stator 10 is produced by molding using an insulating resin so as to cover the stator 10.

According to Embodiment 1, holding grooves 17 that hold first current-carrying members 30 are formed on first guiding portions 16 of first insulating bobbins 15, and holding grooves 26 that hold a second current-carrying member 35 are formed on first guiding portions 25 of second insulating bobbins 24. In other words, because current-carrying member holding portions are disposed on the first guiding portions 16 and 25 of the first and second insulating bobbins 15 and 24, a holder for holding the current-carrying members that was required in Patent Literature 1 is no longer required. Thus, the number of parts can be reduced. Because it is not necessary to dispose a holder approximately coaxially at the first axial end of the stator core 11, axial dimensions of the stator 10 can be reduced, enabling the brushless motor 1 to be reduced in size.

Because the current-carrying member holding portions are configured by forming the holding grooves 26 on the first guiding portions 16 and 25, the current-carrying member holding portions can be disposed on the first guiding portions 16 and 25 without enlarging the first guiding portions 16 and 25, which form concave spaces into which the concentrated winding coils 14*a* are wound. Consequently, there are no increases in axial dimensions of the stator 10 that result from disposing the current-carrying member holding portions.

Now, in Patent Literature 1, because the current-carrying members are bent into a circular arc shape and are housed and held in each of a plurality of grooves that are formed in a concentric circular pattern on a side surface of an annular holder that is disposed at a first axial end of the stator core, the overall lengths before bending of the current-carrying members that are housed in the grooves are different, and bending radii thereof are also different. Thus, because dedicated current-carrying members are required for each of the grooves, the number of parts is increased, and the number of pressing dies is also increased.

In Embodiment 1, the holding grooves 17 are each formed so as to open radially outward, and so as to pass through the first guiding portions 16 circumferentially, and are arranged in three layers in an axial direction. Thus, the diameters of the current-carrying members that are housed and held in each of the three groups of holding grooves 17 that have the same axial position are equal. In other words, the current-carrying members that are housed and held in the three holding grooves 17 of the first guiding portions 16 of the first insulating bobbins 15 can be made to have identical shapes. Because only one holding groove 26 is formed on the first guiding portions 25 of the second insulating bobbins 24, one current-carrying member is housed and held in the holding grooves 26 of the first guiding portions 25 of the second insulating bobbins 24. Thus, there are only two types of current-carrying members, i.e., the first and second current-carrying members 30 and 35, suppressing increases in the number of parts, and reducing the number of pressing dies.

Because the rectilinear core member 12 is bent into an approximately annular shape with the rectilinear first current-carrying members 30 housed and held in the holding grooves 17 of the first insulating bobbins 15, it is not necessary to bend the first current-carrying members 30 into a circular arc shape. Thus, a step of bending the first current-carrying members 30 into circular arc shapes is eliminated, making a pressing die for bending no longer necessary, and also increasing productivity.

Because the first current-carrying members 30 are configured into rectilinear strip-shaped bodies by continuously linking first edges in a width direction of longitudinal end portions of seven flat, approximately rectangular current-carrying portions 31 to each other by means of narrow linking portions 32, the bending of the linking portions 32 in a direction that is perpendicular to the plate thickness direction and the longitudinal direction of the first current-carrying members 30 is facilitated. Thus, the step of forming the rectilinear core member 12 into an approximately annular shape by bending at the linking portions 13*c* is facilitated.

Engaging recess portions 19 are formed on bottom portions of the holding grooves 17, and engaging salient portions 31*a* that engage with the engaging recess portions 19 are formed on each of the current-carrying portions 31. In addition, engaging hooks 33 that are formed on the current-carrying portions 31 that are positioned on the two ends of the first current-carrying members 30 are snap-fitted onto bearing portions 18 that are formed on the first guiding portions 16. Thus, the first current-carrying members 30 are housed and held in the holding grooves 17 in a positioned state. The occurrence of dislodging or lifting of the first current-carrying members 30 from the holding grooves 17 during transportation of the core member 12 with the first current-carrying members 30 mounted, and the occurrence of misalignment of the first current-carrying members 30 in the step of bending the core member 12, can thereby be suppressed, enabling improvements in productivity to be achieved.

Moreover, in Embodiment 1 above, the engaging hooks 33 are formed only on the current-carrying portions 31 that are positioned at the two ends of the core member 12, but the engaging hooks 33 may be formed on all of the current-carrying portions 31 of the core member 12.

In Embodiment 1 above, the first and second current-carrying members 30 and 35 are housed and held in the holding grooves 17, and then the concentrated winding coils 14*a* are mounted onto the core blocks 13, but the concentrated winding coils 14*a* may be mounted onto the core blocks 13, and then the first and second current-carrying members 30 and 35 may be housed and held in the holding grooves 17.

In Embodiment 1 above, the stator winding 14 is configured by wye-connecting the concentrated winding coils 14*a*, but the alternating-current connection of the concentrated winding coils 14*a* is not limited to a wye connection, and the stator winding 14 may be configured by delta-connecting the concentrated winding coils 14*a*, for example. In that case, coil terminals 14*b* of the concentrated winding coils 14*a* are led out from the concentrated winding coils 14*a* to a first axial side, crossover wires between the concentrated winding coils 14*a* are led out to the first axial side, and rectilinear first current-carrying members are produced in which ten current-carrying portions 31 are linked continuously by linking portions 32. Then, three first current-carrying members that have been produced in this manner are housed in respective groups of holding grooves 17 that have the same axial position so as to be offset by one holding groove 17 from each other.

Then, the coil terminals 14*b* of the first, fourth, seventh, and tenth concentrated winding coils 14*a* are connected to coil connecting terminals that are formed on the first current-carrying member that is housed and held in a first group of holding grooves 17. The coil terminals 14*b* of the second, fifth, eighth, and eleventh concentrated winding coils 14*a* are connected to coil connecting terminals that are formed on the first current-carrying member that is housed and held in a second group of holding grooves 17. In addition, the coil terminals 14*b* of the third, sixth, ninth, and twelfth concentrated winding coils 14*a* are connected to coil connecting terminals that are formed on the first current-carrying member that is housed and held in a third group of holding grooves 17.

Next, a crossover wire between the first and fourth concentrated winding coils 14*a* and a crossover wire between the seventh and tenth concentrated winding coils 14*a* are connected to a coil connecting terminal that is formed on the first current-carrying member that is housed and held in the second group of holding grooves 17. A crossover wire between the second and fifth concentrated winding coils 14*a* and a crossover wire between the eighth and eleventh concentrated winding coils 14*a* are connected to a coil connecting terminal that is formed on the first current-carrying member that is housed and held in the third group of holding grooves 17. In addition, a crossover wire between the third and sixth concentrated winding coils 14a and a crossover wire between the ninth and twelfth concentrated winding coils 14a are connected to a coil connecting terminal that is formed on the first current-carrying member that is housed and held in the first group of holding grooves 17. A stator winding 14 is thereby obtained that is formed by delta-connecting a U-phase coil, a V-phase coil, and a W-phase that are configured by connecting four concentrated winding coils 14a in parallel. The three first current-carrying members 30 constitute power supplying portions of the stator winding 14. Moreover, a second current-carrying member 35 is not required.

Embodiment 2

Figure 16:
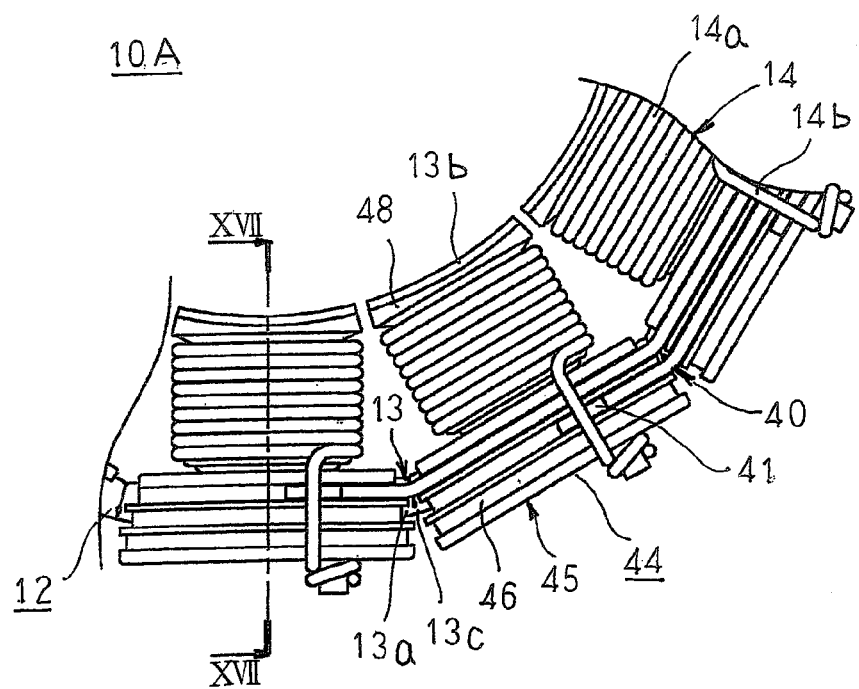
FIG. 16 is a partial plan that shows a stator of a brushless motor according to Embodiment 2 of the present invention.
Figure 17:
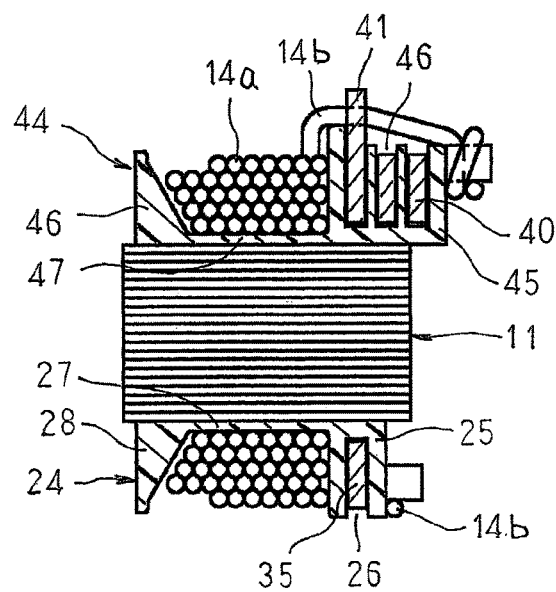
FIG. 17 is a cross section that is taken along Line XVII-XVII in FIG. 16 so as to be viewed in the direction of the arrows.
Figure 18:
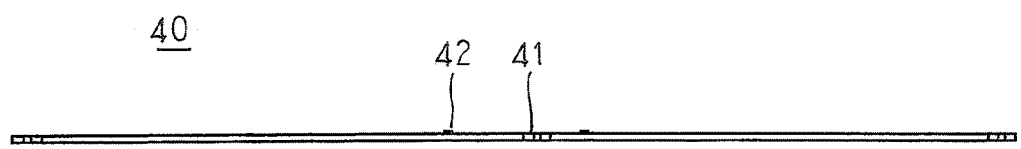
FIG. 18 is a front elevation that shows a first current-carrying member that is used in the stator of the brushless motor according to Embodiment 2 of the present invention.
Figure 19:
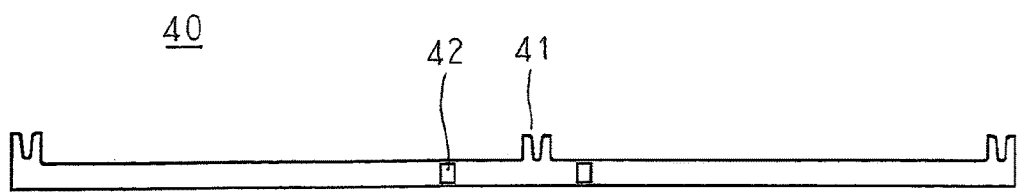
FIG. 19 is a side elevation that shows the first current-carrying member that is used in the stator of the brushless motor according to Embodiment 2 of the present invention.
Figure 20:
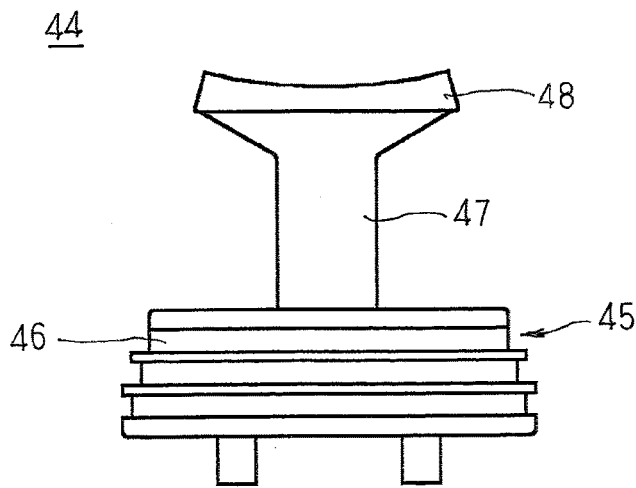
FIG. 20 is a front elevation that shows a first insulating bobbin that is used in the stator of the brushless motor according to Embodiment 2 of the present invention.
Figure 21:
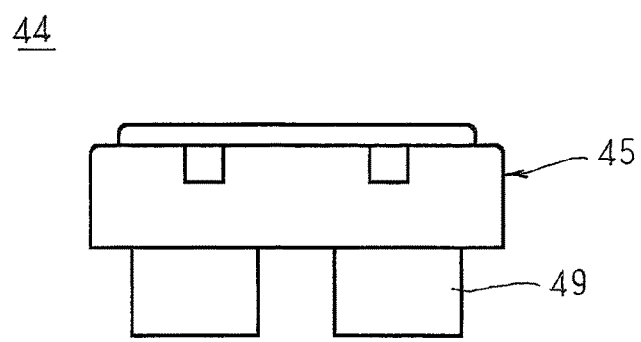
FIG. 21 is a rear elevation that shows the first insulating bobbin that is used in the stator of the brushless motor according to Embodiment 2 of the present invention.
Figure 22:
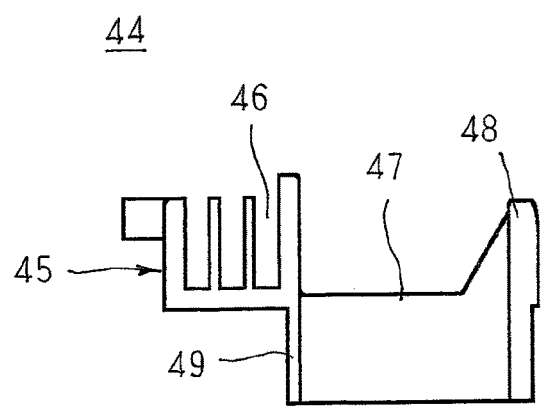
FIG. 22 is a side elevation that shows the first insulating bobbin that is used in the stator of the brushless motor according to Embodiment 2 of the present invention.

FIG. 16 is a partial plan that shows a stator of a brushless motor according to Embodiment 2 of the present invention, FIG. 17 is a cross section that is taken along Line XVII-XVII in FIG. 16 so as to be viewed in the direction of the arrows, FIG. 18 is a front elevation that shows a first current-carrying member that is used in the stator of the brushless motor according to Embodiment 2 of the present invention, FIG. 19 is a side elevation that shows the first current-carrying member that is used in the stator of the brushless motor according to Embodiment 2 of the present invention, FIG. 20 is a front elevation that shows a first insulating bobbin that is used in the stator of the brushless motor according to Embodiment 2 of the present invention, FIG. 21 is a rear elevation that shows the first insulating bobbin that is used in the stator of the brushless motor according to Embodiment 2 of the present invention, and FIG. 22 is a side elevation that shows the first insulating bobbin that is used in the stator of the brushless motor according to Embodiment 2 of the present invention.

In FIGS. 18 and 19, a first current-carrying member 40 is produced by press-molding a thin sheet of copper, for example, into a rectilinear strip-shaped body that has a length that is approximately equal to a length when seven core blocks 13 are linked together. Three coil connecting terminals 41 are formed at two ends and a central portion in a longitudinal direction so as to each protrude in a width direction from a first long side of the first current-carrying member 40. In addition, two salient portions 42 are formed on a surface of the first current-carrying member 40. Moreover, the sum of a sheet thickness of the first current-carrying member 40 and a protruding height of the salient portions 42 is slightly larger than a groove width of holding grooves 46 that are described below.

In FIGS. 20 through 22, a first insulating bobbin 44 is a resin-molded body that is molded using nylon, for example, and includes: a trunk portion 47 that is disposed so as to orient a longitudinal direction in a radial direction of a tooth portion 13b such that a bottom surface lies alongside a first axial end surface of the tooth portion 13b; a first guiding portion 45 that protrudes from a first longitudinal end of the trunk portion 47 away from the bottom surface (away from a yoke portion 13a); a second guiding portion 48 that protrudes from a second longitudinal end of the trunk portion 47 away from the bottom surface (away from the tooth portion 13b) so as to face the first guiding portion 45; and a skirt portion 49 that protrudes from the trunk portion 47, the first guiding portion 45, and the second guiding portion 48 to cover a first axial end portion of the inner circumferential wall surface of the yoke portion 13a and first axial end portions of side surfaces of the tooth portion 13b. In addition, three holding grooves 46 are formed on the first guiding portion 45 so as to line up radially so as to open axially outward and so as to have groove directions in a circumferential direction to constitute a current-carrying member holding portion.

To assemble a stator 10A according to Embodiment 2, a rectilinear core member 12 is produced in which the yoke portions 13a of the core blocks 13 are arranged continuously so as to be linked by the linking portions 13c, the first insulating bobbins 44 are disposed on first ends of each of the core blocks 13 in a direction of lamination of the electromagnetic steel sheets (in an axial direction), and the second insulating bobbins 24 are disposed on second axial ends of each of the core blocks 13, in a similar manner to Embodiment 1 above.

One first current-carrying member 40 is inserted from an axial direction into a group of holding grooves 46 that are positioned on a first side in the direction of protrusion of the tooth portions 13b (the radial direction) among the holding grooves 46 that are formed on the first guiding portions 45 of the first insulating bobbins 44 that are disposed on the first axial ends of the first through seventh core blocks 13 such that a plate thickness direction of the first current-carrying member 40 is oriented in the radial direction. At this point, because the sum of the sheet thickness of the first current-carrying member 40 and the protruding height of the salient portions 42 is slightly larger than the groove width of holding grooves 46, portions of the salient portions 42 of the first current-carrying member 40 are press-fitted into the holding grooves 46, and the first current-carrying member 40 is housed and held in the holding grooves 46 of the first insulating bobbins 44 by the pressure from inserting the salient portions 42.

Next, one first current-carrying member 40 is inserted into a group of holding grooves 46 that are positioned centrally in the radial direction among the holding grooves 46 that are formed on the first guiding portions 45 of the first insulating bobbins 44 that are disposed on the first axial ends of the second through eighth core blocks 13. The first current-carrying member 40 is thereby housed and held in the holding grooves 46 of the first insulating bobbins 44. In addition, one first current-carrying member 40 is inserted into a group of holding grooves 46 that are positioned on a second side in the radial direction among the holding grooves 46 that are formed on the first guiding portions 45 of the first insulating bobbins 44 that are disposed on the first axial ends of the third through ninth core blocks 13. The first current-carrying member 40 is thereby housed and held in the holding grooves 46 of the first insulating bobbins 44.

In this manner, three first current-carrying members 40 are housed and held in holding grooves 46 of twelve first insulating bobbins 44 that are disposed on a first axial end of the core member 12. The coil connecting terminals 41 project from the holding grooves 46 of each of the first insulating bobbins 44.

Next, one second current-carrying member 35 is inserted into one group of holding grooves 26 that is formed on the first guiding portions 25 of the second insulating bobbins 24 that are disposed on the second axial ends of the seventh through twelfth core blocks 13. The second current-carrying member 35 is thereby housed and held in holding grooves 26 of twelve second insulating bobbins 24 that are disposed on a second axial end of the core member 12. The coil connecting terminals 36 project from the holding grooves 26 of each of the second insulating bobbins 24.

Next, an conductor wire is passed through the concave spaces that are formed by the trunk portions 47 and 27 and the first and second guiding portions 45, 48, 25, and 28 of the first and second insulating bobbins 44 and 24 that are disposed on the two axial end surfaces of the first core block 13, and wound around the tooth portion 13b for a predetermined number of turns, and then is passed through the concave spaces that are formed by the trunk portions 47 and 27 and the first and second guiding portions 45, 48, 25, and 28 of the first and second insulating bobbins 44 and 24 that are disposed on the two axial end surfaces of the fourth core block 13, and wound around the tooth portion 13b for a predetermined number of turns, to mount concentrated winding coils 14a onto the first and fourth core blocks 13.

Similarly, concentrated winding coils 14a are mounted onto the second and fifth core blocks 13, concentrated winding coils 14a are mounted onto the third and sixth core blocks 13, concentrated winding coils 14a are mounted onto the seventh and tenth core blocks 13, concentrated winding coils 14a are mounted onto the eighth and eleventh core blocks 13, and concentrated winding coils 14a are mounted onto the ninth and twelfth core blocks 13. The coil terminals 14b of the concentrated winding coils 14a that are mounted onto the first through sixth core blocks 13 are led out at the first axial end of the concentrated winding coils 14a, and the coil terminals 14b of the concentrated winding coils 14a that are mounted onto the seventh through twelfth core blocks 13 are led out at the second axial end of the concentrated winding coils 14a.

Next, as shown in FIG. 17, a crossover wire between the coil terminals 14b of the concentrated winding coils 14a that are mounted onto the first and fourth core blocks 13 and the concentrated winding coils 14a that are mounted onto the seventh and tenth core blocks 13 is connected to the coil connecting terminal 41 of the first current-carrying member 40 that is inserted into the group of holding grooves 46 that are positioned on a first side in the radial direction among the holding grooves 46. A crossover wire between the coil terminals 14b of the concentrated winding coils 14a that are mounted onto the second and fifth core blocks 13 and the concentrated winding coils 14a that are mounted onto the eighth and eleventh core blocks 13 is connected to the coil connecting terminal 41 of the first current-carrying member 40 that is inserted into the group of holding grooves 46 that are positioned centrally in the radial direction among the holding grooves 46. In addition, a crossover wire between the coil terminals 14b of the concentrated winding coils 14a that are mounted onto the third and sixth core blocks 13 and the concentrated winding coils 14a that are mounted onto the ninth and twelfth core blocks 13 is connected to the coil connecting terminal 41 of the first current-carrying member 40 that is inserted into the group of holding grooves 46 that are positioned on a second side in the radial direction among the holding grooves 46.

Next, the coil terminals 14b of the concentrated winding coils 14a that are mounted onto the seventh through twelfth core blocks 13 are connected to the coil connecting terminals 36 of the second current-carrying member 35. A stator winding 14 is thereby obtained that is formed by wye-connecting a U-phase coil, a V-phase coil, and a W-phase that are each configured by connecting four concentrated winding coils 14a into two series and two parallel connections. The crossover wire between the concentrated winding coils 14a that are mounted onto the first and fourth core blocks 13, the crossover wire between the concentrated winding coils 14a that are mounted onto the second and fifth core blocks 13, and the crossover wire between the concentrated winding coils 14a that are mounted onto the third and sixth core blocks 13 constitute power supplying portions of the U-phase coil, the V-phase coil, and the W-phase.

Next, the core member 12 is bent into an approximately annular shape by bending the linking portions 13c that link together the outer circumferential edge portions of the yoke portions 13a. At this point, the first current-carrying members 30 and the second current-carrying member 35 are bent into approximately annular shapes by being bent in the plate thickness direction. Then, circumferential side surfaces of the yoke portions 13a of the core blocks 13 that are positioned on the two ends of the core member 12 are abutted together and the core member 12 is made to have an approximately annular shape, to produce a stator 10A that is shown in FIG. 16.

In Embodiment 2, because holding grooves 46 are formed on first guiding portions 45 of first insulating bobbins 44, and holding grooves 26 are formed on first guiding portions 25 of second insulating bobbins 24, forming current-carrying member holding portions on the first guiding portions 45 and 25, the number of parts can also be reduced, and the axial dimensions of the stator 10A can be reduced, in a similar manner to Embodiment 1 above.

The holding grooves 46 are each formed so as to open axially outward, and so as to pass through the first guiding portions 45 circumferentially, and are arranged in three layers in a radial direction. However, because the first current-carrying members 40 have rectilinear strip-shaped body shapes, and are housed and held in groups of holding grooves 46 that are arranged in the longitudinal direction of the rectilinear core member 12, and are bent simultaneously in a step of bending the core member 12 into an approximately annular shape, bending of the first current-carrying members in a preceding step to being housed in the holding grooves, which was required in Patent Literature 1, is no longer required. Consequently, the first current-carrying members 40 that are housed and held in each of the groups of holding grooves 46 can be made to have identical shapes. Thus, in Embodiment 2, there are also only two types of current-carrying members, i.e., the first and second current-carrying members 30 and 35, suppressing increases in the number of parts, and reducing the number of pressing dies.

Salient portions 42 are formed on surfaces of the first current-carrying members 40, and portions of the salient portions 42 are press-fitted into the holding grooves 46, housing and holding the first current-carrying members 40 in the holding grooves 46. Thus, in Embodiment 2, the occurrence of dislodging or lifting of the first current-carrying members 40 from the holding grooves 46 during transportation of the core member 12 with the first current-carrying members 40 mounted, and the occurrence of misalignment of the first current-carrying members 40 in the step of bending the core member 12, can also be suppressed, enabling improvements in productivity to be achieved.

According to Embodiment 2, because the first current-carrying members 40 are bent in a plate thickness direction, the linking portions 32 in the first current-carrying members 30 are no longer required. In other words, because notches for forming the linking portions 32 are no longer required, a large cross-sectional area can be ensured in the first current-carrying members 40. Thus, the present brushless motor that includes the stator 10A can be used in applications that require a large current.

Moreover, in Embodiment 2 above, the first and second current-carrying members 40 and 35 are housed and held in the holding grooves 46, and then the concentrated winding coils 14a are mounted onto the core blocks 13, but the concentrated winding coils 14a may be mounted onto the core blocks 13, and then the first and second current-carrying members 40 and 35 may be housed and held in the holding grooves 46.

Embodiment 3

Figure 23:
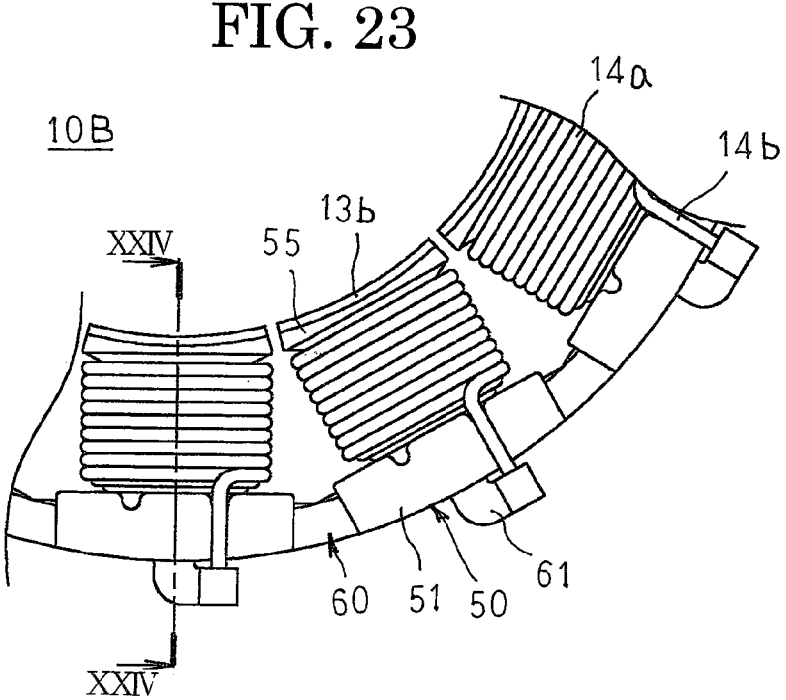
FIG. 23 is a partial plan that shows a stator of a brushless motor according to Embodiment 3 of the present invention.
Figure 24:
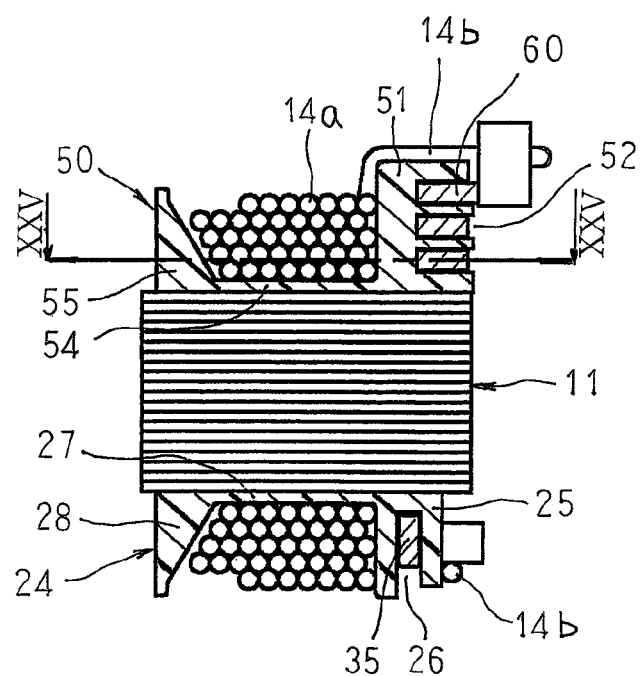
FIG. 24 is a cross section that is taken along Line XXIV-XXIV in FIG. 23 so as to be viewed in the direction of the arrows.
Figure 25:
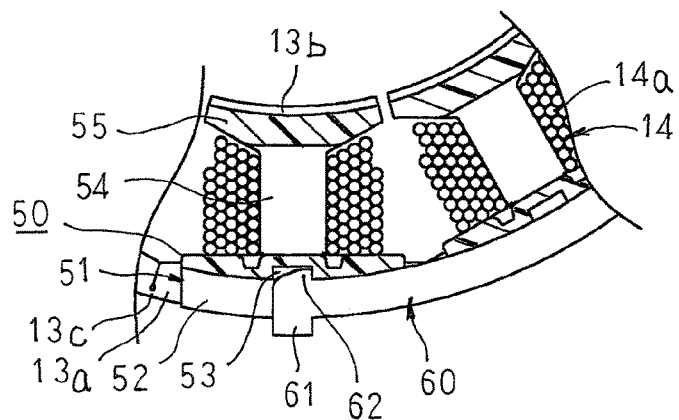
FIG. 25 is a cross section that is taken along Line XXV-XXV in FIG. 24 so as to be viewed in the direction of the arrows.
Figure 26:
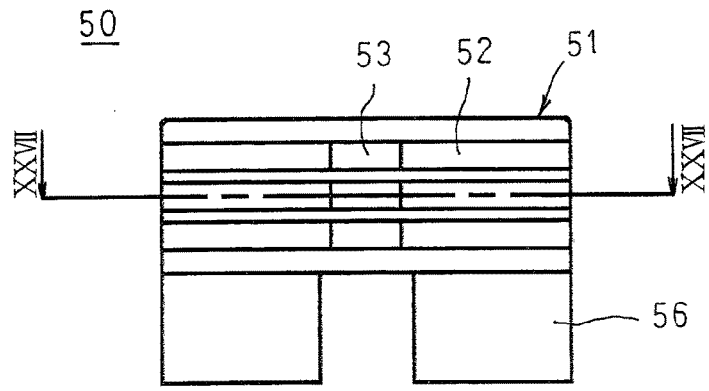
FIG. 26 is a front elevation that shows a first insulating bobbin that is used in the stator of the brushless motor according to Embodiment 3 of the present invention.
Figure 27:
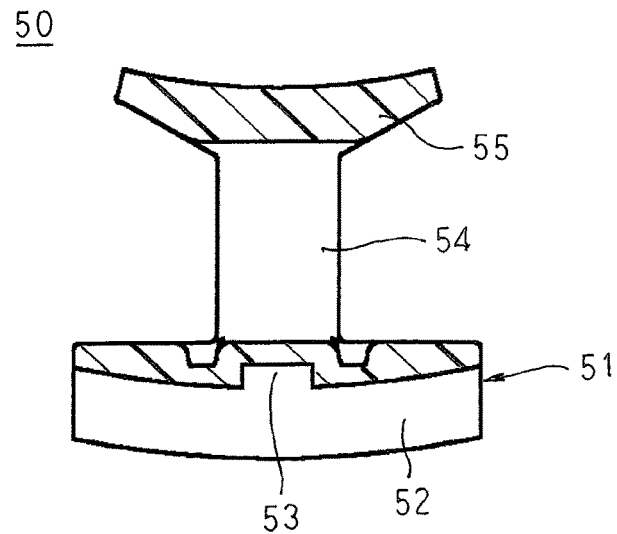
FIG. 27 is a cross section that is taken along Line XXVII-XXVII in FIG. 26 so as to be viewed in the direction of the arrows.
Figure 28:
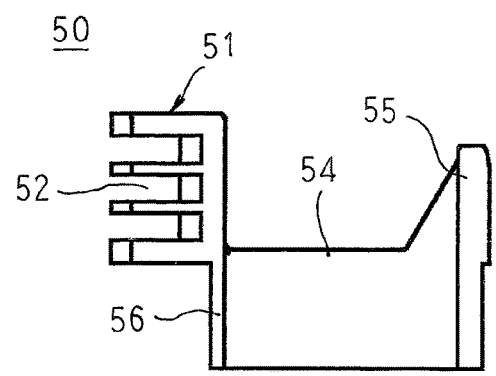
FIG. 28 is a side elevation that shows a first insulating bobbin that is used in the stator of the brushless motor according to Embodiment 3 of the present invention.
Figure 29:
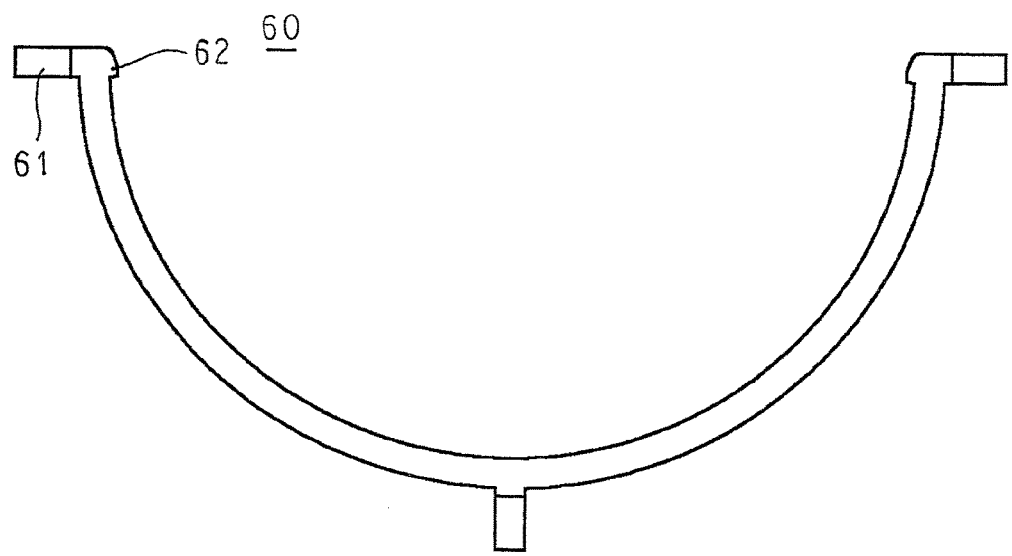
FIG. 29 is a front elevation that shows a first current-carrying member that is used in the stator of the brushless motor according to Embodiment 3 of the present invention.
Figure 30:
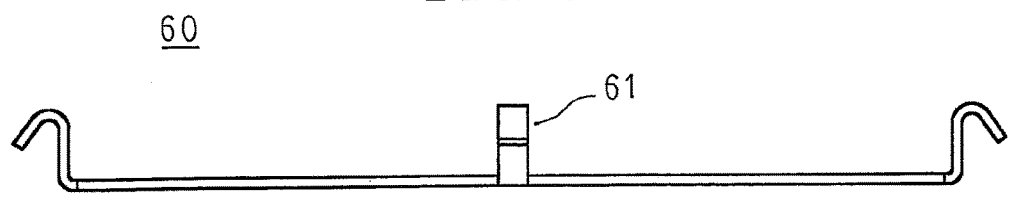
FIG. 30 is a side elevation that shows the first current-carrying member that is used in the stator of the brushless motor according to Embodiment 3 of the present invention.

FIG. 23 is a partial plan that shows a stator of a brushless motor according to Embodiment 3 of the present invention, FIG. 24 is a cross section that is taken along Line XXIV-XXIV in FIG. 23 so as to be viewed in the direction of the arrows, FIG. 25 is a cross section that is taken along Line XXV-XXV in FIG. 24 so as to be viewed in the direction of the arrows, FIG. 26 is a front elevation that shows a first insulating bobbin that is used in the stator of the brushless motor according to Embodiment 3 of the present invention, FIG. 27 is a cross section that is taken along Line XXVII-XXVII in FIG. 26 so as to be viewed in the direction of the arrows, FIG. 28 is a side elevation that shows a first insulating bobbin that is used in the stator of the brushless motor according to Embodiment 3 of the present invention, FIG. 29 is a front elevation that shows a first current-carrying member that is used in the stator of the brushless motor according to Embodiment 3 of the present invention, and FIG. 30 is a side elevation that shows the first current-carrying member that is used in the stator of the brushless motor according to Embodiment 3 of the present invention.

In FIGS. 26 through 28, a first insulating bobbin 50 is a resin-molded body that is molded using nylon, for example, and includes: a trunk portion 54 that is disposed so as to orient a longitudinal direction in a radial direction of a tooth portion 13b such that a bottom surface lies alongside a first axial end surface of the tooth portion 13b; a first guiding portion 51 that protrudes from a first longitudinal end of the trunk portion 54 away from the bottom surface (away from a yoke portion 13a); a second guiding portion 55 that protrudes from a second longitudinal end of the trunk portion 54 away from the bottom surface (away from the tooth portion 13b) so as to face the first guiding portion 51; and a skirt portion 56 that protrudes from the trunk portion 54, the first guiding portion 51, and the second guiding portion 55 to cover a first axial end portion of the inner circumferential wall surface of the yoke portion 13a and first axial end portions of side surfaces of the tooth portion 13b.

Three holding grooves 52 are formed on the first guiding portion 51 so as to line up axially so as to open radially outward and so as to have groove directions in a circumferential direction to constitute a current-carrying member holding portion. Bearing portions 53 are recessed into circumferentially central portions of bottom portions of the holding grooves 52.

In FIGS. 29 and 30, the first current-carrying member 60 is produced by press-molding a thin sheet of copper that is coated with an insulator, for example, into a semicircular arc-shaped flat strip. Coil connecting terminals 61 are formed on two end portions and a central portion in a longitudinal direction so as to each protrude radially outward from an outer circumferential side of the first current-carrying member 60. In addition, engaging hooks 62 are formed so as to protrude radially inward from two longitudinal ends of an inner circumferential side of the first current-carrying member 60.

To assemble a stator 10B according to Embodiment 3, a rectilinear core member 12 is produced in which the yoke portions 13a of the core blocks 13 are arranged continuously so as to be linked by the linking portions 13c, the first insulating bobbins 50 are disposed on first ends of each of the core blocks 13 in an axial direction (in a direction of lamination of the electromagnetic steel sheets), and second insulating bobbins 24 are disposed on second axial ends of each of the core blocks 13, in a similar manner to Embodiment 1 above.

A conductor wire is passed through the concave spaces that are formed by the trunk portions 47 and 27 and the first and second guiding portions 45, 48, 25, and 28 of the first and second insulating bobbins 44 and 24 that are disposed on the two axial end surfaces of the first core block 13, and wound around the tooth portion 13b for a predetermined number of turns, and then is passed through the concave spaces that are formed by the trunk portions 47 and 27 and the first and second guiding portions 45, 48, 25, and 28 of the first and second insulating bobbins 44 and 24 that are disposed on the two axial end surfaces of the fourth core block 13, and wound around the tooth portion 13b for a predetermined number of turns, to mount concentrated winding coils 14a onto the first and fourth core blocks 13.

Similarly, concentrated winding coils 14a are mounted onto the second and fifth core blocks 13, concentrated winding coils 14a are mounted onto the third and sixth core blocks 13, concentrated winding coils 14a are mounted onto the seventh and tenth core blocks 13, concentrated winding coils 14a are mounted onto the eighth and eleventh core blocks 13, and concentrated winding coils 14a are mounted onto the ninth and twelfth core blocks 13. The coil terminals 14b of the concentrated winding coils 14a that are mounted onto the first through sixth core blocks 13 are led out at the first axial end of the concentrated winding coils 14a, and the coil terminals 14b of the concentrated winding coils 14a that are mounted onto the seventh through twelfth core blocks 13 are led out at the second axial end of the concentrated winding coils 14a.

Next, one second current-carrying member 35 is inserted into the holding grooves 26 that are formed on the first guiding portions 25 of the second insulating bobbins 24 that are disposed on the second axial ends of the seventh through twelfth core blocks 13.

Next, the core member 12 is bent into an approximately annular shape by bending the linking portions 13c that link together the outer circumferential edge portions of the yoke portions 13a. Then, the first current-carrying members 60 are inserted from radially outside into each of the groups of holding grooves 52 that have the same axial position such that plate thickness directions of the first current-carrying members 30 are oriented in an axial direction. As shown in FIG. 25, the engaging hooks 62 thereby snap-fit into the bearing portions 53, holding and housing the first current-carrying members 60 in each of the groups of holding grooves 52.

Next, a crossover wire between the coil terminals 14b of the concentrated winding coils 14a that are mounted onto the first and fourth core blocks 13 and the concentrated winding coils 14a that are mounted onto the seventh and tenth core blocks 13 is connected by fusing to the coil connecting terminal 61 of the first current-carrying member 60 that is inserted into the group of holding grooves 52 that are positioned on a first side in the axial direction among the holding grooves 52. A crossover wire between the coil terminals 14b of the concentrated winding coils 14a that are mounted onto the second and fifth core blocks 13 and the concentrated winding coils 14a that are mounted onto the eighth and eleventh core blocks 13 is connected by fusing to the coil connecting terminal 61 of the first current-carrying member 60 that is inserted into the group of holding grooves 52 that are positioned centrally in the axial direction among the holding grooves 52. In addition, a crossover wire between the coil terminals 14b of the concentrated winding coils 14a that are mounted onto the third and sixth core blocks 13 and the concentrated winding coils 14a that are mounted onto the ninth and twelfth core blocks 13 is connected by fusing to the coil connecting terminal 61 of the first current-carrying member 60 that is inserted into the group of holding grooves 52 that are positioned on a second side in the axial direction among the holding grooves 52.

Next, the coil terminals 14b of the concentrated winding coils 14a that are mounted onto the seventh through twelfth core blocks 13 are connected to the coil connecting terminals 36 of the second current-carrying member 35. A stator winding 14 is thereby obtained that is formed by wye-connecting a U-phase coil, a V-phase coil, and a W-phase that are each configured by connecting four concentrated winding coils 14a into two series and two parallel connections. The crossover wire between the concentrated winding coils 14a that are mounted onto the first and fourth core blocks 13, the crossover wire between the concentrated winding coils 14a that are mounted onto the second and fifth core blocks 13, and the crossover wire between the concentrated winding coils 14a that are mounted onto the third and sixth core blocks 13 constitute power supplying portions of the U-phase coil, the V-phase coil, and the W-phase. The stator 10B that is shown in FIGS. 23 and 24 is produced thereby.

In Embodiment 3, because holding grooves 52 are formed on first guiding portions 51 of first insulating bobbins 50, and holding grooves 26 are formed on first guiding portions 25 of second insulating bobbins 24, forming current-carrying member holding portions on the first guiding portions 51 and 25, the number of parts can also be reduced, and the axial dimensions of the stator 10B can be reduced, in a similar manner to Embodiment 1 above.

The holding grooves 52 are each formed so as to open radially outward, and so as to pass through the first guiding portions 51 circumferentially, and are arranged in three layers in an axial direction. Then, the first current-carrying members 60 that are formed so as to have circular arc shapes are mounted from radially outside into each of the groups of holding grooves 52 that have the same axial position after the core member 12 has been bent into an approximately annular shape. Consequently, the first current-carrying members 60 that are housed and held in each of the groups of holding grooves 52 can be made to have identical shapes. Thus, in Embodiment 3, increases in the number of parts are also suppressed, and the number of pressing dies is reduced.

Engaging hooks 62 are formed on the first current-carrying members 60, and the first current-carrying members 60 are housed and held in the holding grooves 52 by snap-fitting the engaging hooks 62 together with bearing portions 53 that are formed on bottom portions of the holding grooves 52. Thus, in Embodiment 3, dislodging or lifting of the first current-carrying members 60 from the holding grooves 52 can also be suppressed, enabling improvements in productivity to be achieved.

Moreover, in Embodiment 3 above, the bearing portions 53 are formed on circumferentially central portions of bottom portions of the holding grooves 53, but the positions at which the bearing portions 53 are formed are not limited to the circumferentially central portions of the bottom portions of the holding grooves 53. The engaging hooks 62 are formed on two longitudinal ends of inner circumferential sides of the first current-carrying members 60, but the positions of formation of the engaging hooks 62 are not limited to the two longitudinal ends of the first current-carrying members 60. In addition, the number of engaging hooks 62 may be three or more.

In each of the above embodiments, the stator core is configured by connecting twelve core blocks continuously using linking portions, but the number of core blocks is not limited to twelve.

In each of the above embodiments, a brushless motor has been explained, but the present invention is not limited to brushless motors, and can be applied to other motors that have similar or identical configurations, and can also be applied to rotary electric machines such as alternators.

In each of the above embodiments, concentrated winding coils that are mounted onto two core blocks continuously using crossover wires are configured by winding conductor wires into concentrated windings continuously on two core blocks, but separate concentrated winding coils may be mounted onto each of the core blocks by winding the conductor wires into concentrated windings on each of the core blocks.

What is claimed is:
1. A stator comprising:
a stator core including a rectilinear core member that is produced by laminating electromagnetic steel sheets in which core blocks that each have a yoke portion and a tooth portion that protrudes radially inward from an inner circumferential wall surface of said yoke portion are constituted by linking outer circumferential edge portions of circumferential side surfaces of said yoke portions by bendable first linking portions, said stator core being configured into an annular shape by bending said first linking portions;
a plurality of pairs of insulating bobbins that each have:
a trunk portion; and
first and second guiding portions that protrude at two longitudinal ends of an upper surface of said trunk portion,
said plurality of pairs of insulating bobbins being each disposed on two axial end surfaces of said core blocks such that longitudinal directions of said trunk portions are oriented in a radial direction of said tooth portions and bottom surfaces of said trunk portions are placed alongside axial end surfaces of said tooth portions;
a plurality of coils that are each produced by winding a conductor wire around said tooth portions for a predetermined number of turns so as to pass through concave spaces that are formed by said trunk portions and said first and second guiding portions of said insulating bobbins that are disposed on said two axial end surfaces of said core blocks; and
a plurality of current-carrying members to which coil terminals of said plurality of coils are connected to configure said plurality of coils into an alternating-current connection,
wherein current-carrying member holding portions that hold said plurality of current-carrying members are formed on said first guiding portions that are positioned on a radially outer side of said insulating bobbins;
wherein said current-carrying member holding portions that are formed on said insulating bobbins that are disposed on first axial end surfaces of said core blocks are each constituted by a plurality of holding grooves that are formed so as to open radially outward and so as to pass through said first guiding portions circumferentially, and that are arranged in a plurality of layers in an axial direction; and wherein said plurality of current-carrying members are produced into rectilinear strip-shaped bodies in each of which first latitudinal ends of longitudinal end portions of a plurality of flat, rectangular current-carrying portions are linked to each other by second linking portions, and are bent at said second linking portions, and said current-carrying portions are housed in respective groups of said holding grooves that are arranged circumferentially so as to have an identical axial position such that longitudinal directions of said current-carrying portions are in a circumferential direction and such that said second linking portions face radially outward.

2. The stator according to claim 1, wherein:
bearing portions are formed on radially inner sides of said holding grooves on two circumferential side portions of said first guiding portions; and
engaging hooks that snap-fit together with said bearing portions are formed on two longitudinal end portions of said current-carrying portions that are positioned at two ends of said current-carrying members.

3. The stator according to claim 1, wherein said plurality of current-carrying members are configured so as to have identical shapes.

4. The manufacturing method for the stator according to claim 1, comprising steps of:
producing said rectilinear core member;
disposing said insulating bobbins on two end surfaces of each of said core blocks of said core member in a direction of lamination of said electromagnetic steel sheets, and producing said plurality of coils by winding said conductor wires around said tooth portions for a predetermined number of turns so as to pass through concave spaces that are formed by said trunk portions and said first and second guiding portions of said insulating bobbins;
housing said current-carrying portions in said respective groups of said holding grooves that are arranged in a longitudinal direction of said core member so as to have an identical position in said direction of lamination of said electromagnetic steel sheets so as to hold each of said plurality of current-carrying members that have been produced into rectilinear strip-shaped bodies in said current-carrying member holding portions; and
bending said core member into an annular shape by bending said first linking portions.

5. The rotary electric machine comprising a stator according to claim 1.

6. A stator comprising:
a stator core including a rectilinear core member that is produced by laminating electromagnetic steel sheets in which core blocks that each have a yoke portion and a tooth portion that protrudes radially inward from an inner circumferential wall surface of said yoke portion are constituted by linking outer circumferential edge portions of circumferential side surfaces of said yoke portions by bendable first linking portions, said stator core being configured into an annular shape by bending said first linking portions;
a plurality of pairs of insulating bobbins that each have:
a trunk portion; and
first and second guiding portions that protrude at two longitudinal ends of an upper surface of said trunk portion,
said plurality of pairs of insulating bobbins being each disposed on two axial end surfaces of said core blocks such that longitudinal directions of said trunk portions are oriented in a radial direction of said tooth portions and bottom surfaces of said trunk portions are placed alongside axial end surfaces of said tooth portions;
a plurality of coils that are each produced by winding a conductor wire around said tooth portions for a predetermined number of turns so as to pass through concave spaces that are formed by said trunk portions and said first and second guiding portions of said insulating bobbins that are disposed on said two axial end surfaces of said core blocks; and
a plurality of current-carrying members to which coil terminals of said plurality of coils are connected to configure said plurality of coils into an alternating-current connection,
wherein current-carrying member holding portions that hold said plurality of current-carrying members are formed on said first guiding portions that are positioned on a radially outer side of said insulating bobbins;
wherein said current-carrying member holding portions that are formed on said insulating bobbins that are disposed on first axial end surfaces of said core blocks are each constituted by a plurality of holding grooves that are formed so as to open axially outward and so as to pass through said first guiding portions circumferentially, and that are arranged in a plurality of layers in an axial direction;
said plurality of current-carrying members are produced into rectilinear strip-shaped bodies, are bent in a plate thickness direction, and are housed in respective groups of said holding grooves that are arranged circumferentially so as to have an identical radial position;
wherein a plurality of salient portions are formed on a surface of said current-carrying member so as to be separated longitudinally; and
wherein said current-carrying member is held in said holding grooves by pressure from said salient portions being inserted into said holding grooves.

7. The stator according to claim 6, wherein said plurality of current-carrying members are configured so as to have identical shapes.

8. The stator according to claim 7, wherein said plurality of current-carrying members are configured so as to have identical shapes.

9. A stator comprising:
a stator core including a rectilinear core member that is produced by laminating electromagnetic steel sheets in which core blocks that each have a yoke portion and a tooth portion that protrudes radially inward from an inner circumferential wall surface of said yoke portion are constituted by linking outer circumferential edge portions of circumferential side surfaces of said yoke portions by bendable first linking portions, said stator core being configured into an annular shape by bending said first linking portions;
a plurality of pairs of insulating bobbins that each have:
a trunk portion; and
first and second guiding portions that protrude at two longitudinal ends of an upper surface of said trunk portion,
said plurality of pairs of insulating bobbins being each disposed on two axial end surfaces of said core blocks such that longitudinal directions of said trunk portions are oriented in a radial direction of said tooth portions and bottom surfaces of said trunk portions are placed alongside axial end surfaces of said tooth portions;
a plurality of coils that are each produced by winding a conductor wire around said tooth portions for a predetermined number of turns so as to pass through concave spaces that are formed by said trunk portions and said first and second guiding portions of said insulating bobbins that are disposed on said two axial end surfaces of said core blocks; and a plurality of current-carrying members to which coil terminals of said plurality of coils are connected to configure said plurality of coils into an alternating-current connection, wherein current-carrying member holding portions that hold said plurality of current-carrying members are formed on said first guiding portions that are positioned on a radially outer side of said insulating bobbins;

wherein said current-carrying member holding portions that are formed on said insulating bobbins that are disposed on first axial end surfaces of said core blocks are each constituted by a plurality of holding grooves that are formed so as to open radially outward and so as to pass through said first guiding portions circumferentially, and that are arranged in a plurality of layers in an axial direction;

wherein said plurality of current-carrying members are produced into circular arc-shaped strip-shaped bodies, and are housed from radially outside in respective groups of said holding grooves that are arranged circumferentially so as to have an identical axial position;

wherein bearing portions are formed on bottom portions of said holding grooves of said first guiding portions; and wherein engaging hooks that snap-fit together with each of said bearing portions that are formed on said bottom portions of said plurality of holding grooves are formed on said current-carrying member.

* * * * *